H. W. MACOMBER & F. H. D. BERGMANN.
AEROPLANE.
APPLICATION FILED APR. 1, 1911.
1,076,218.
Patented Oct. 21, 1913.
6 SHEETS—SHEET 3.
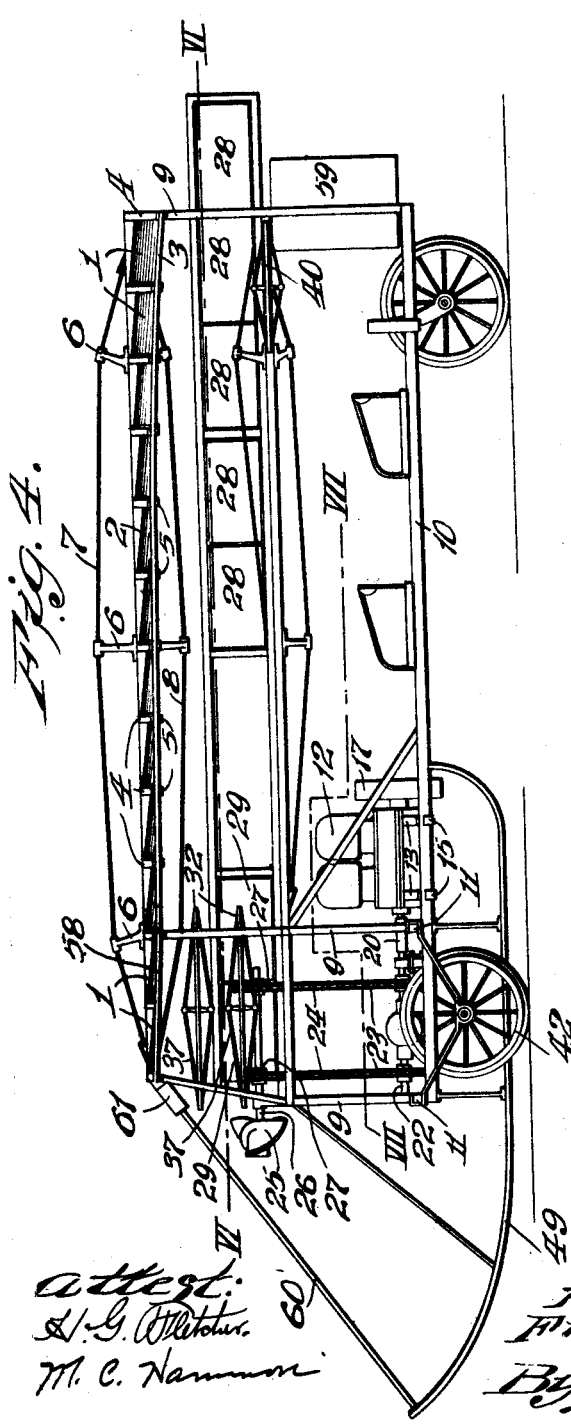
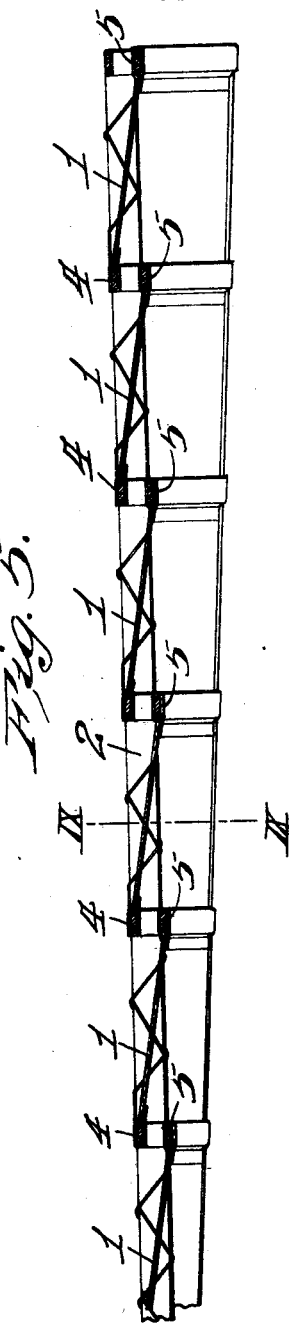
Inventors:
Harry W. Macomber.
Frederich H. D. Bergmann.

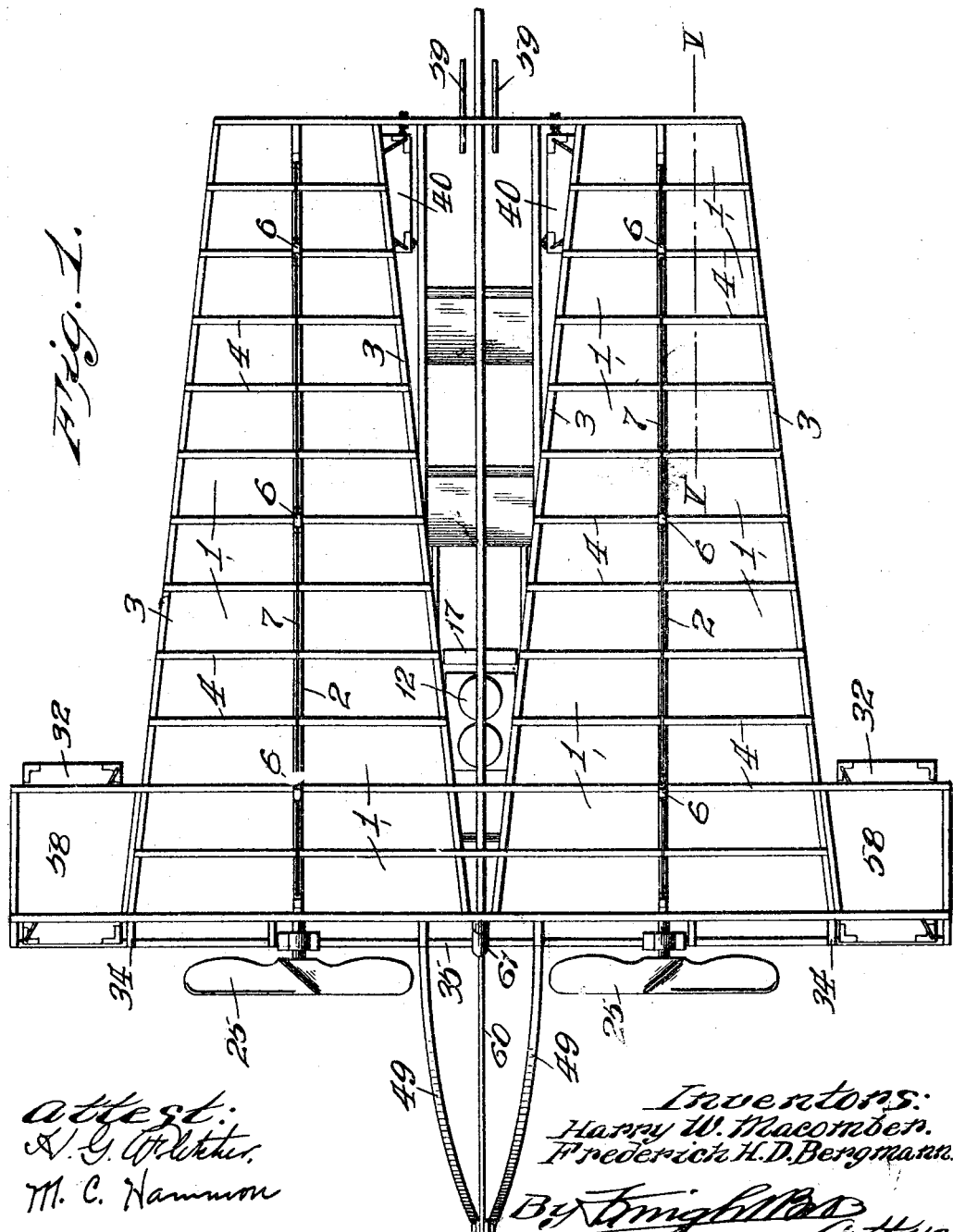

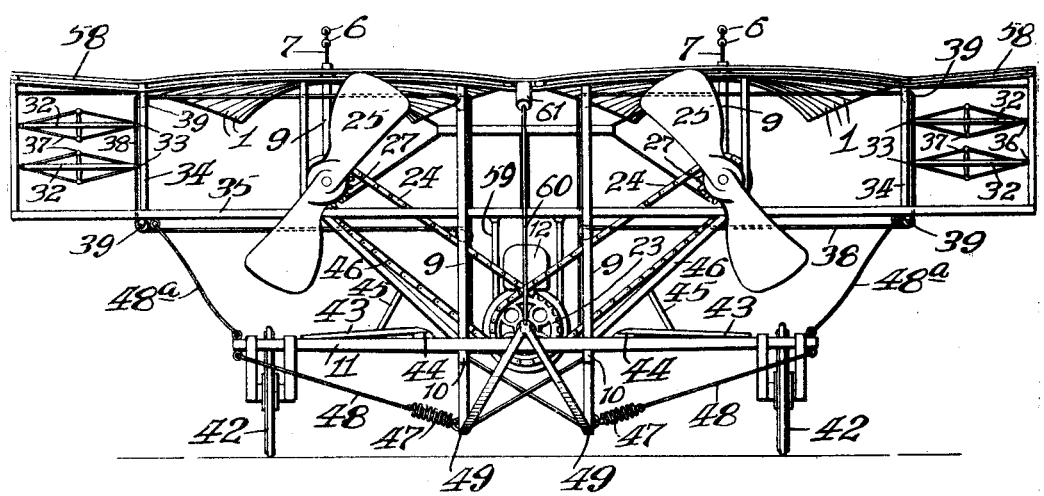
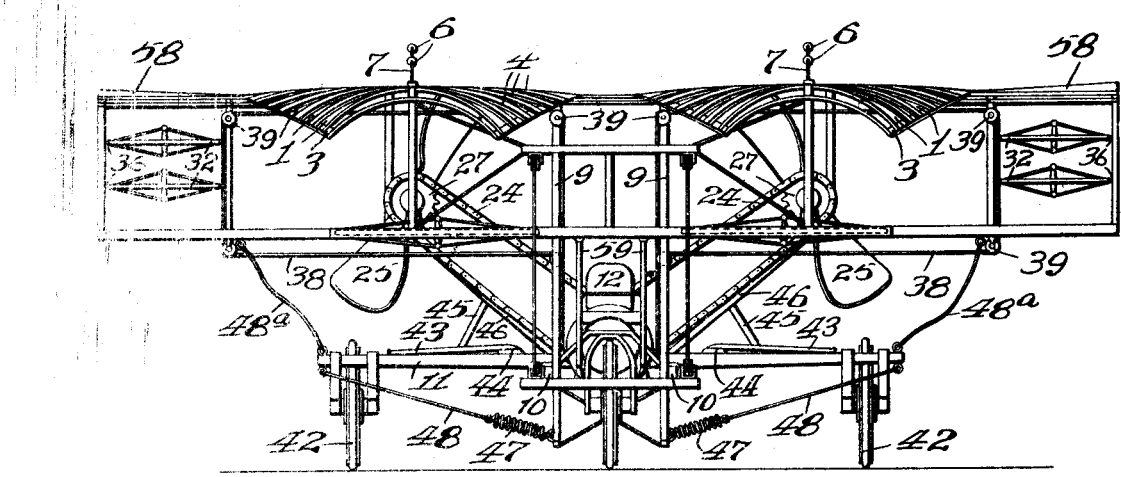

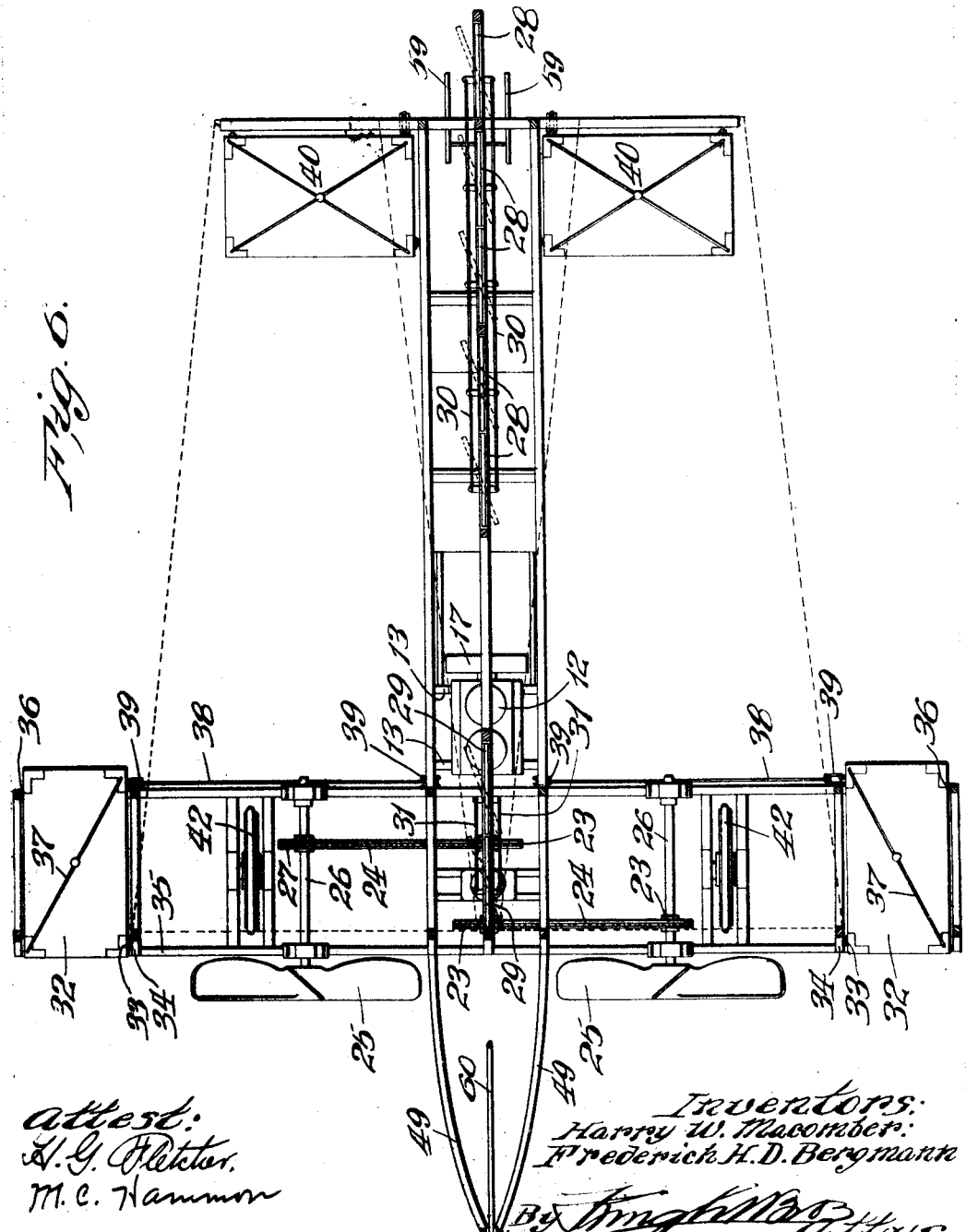

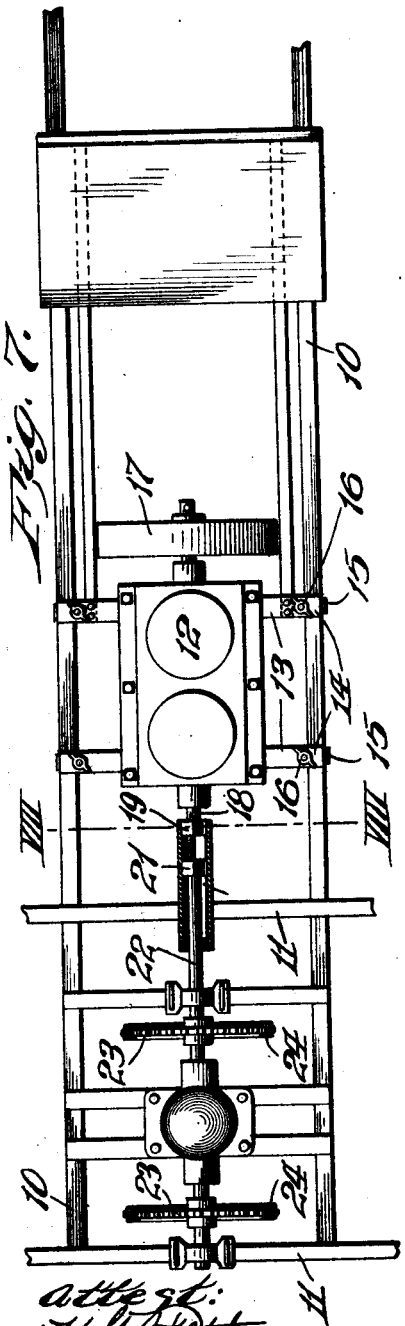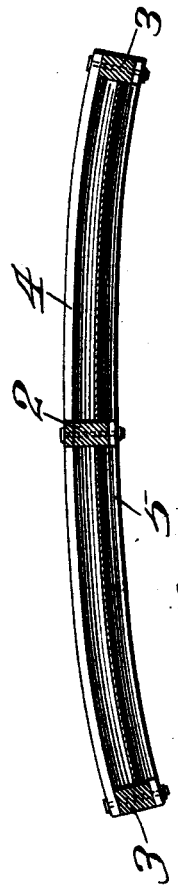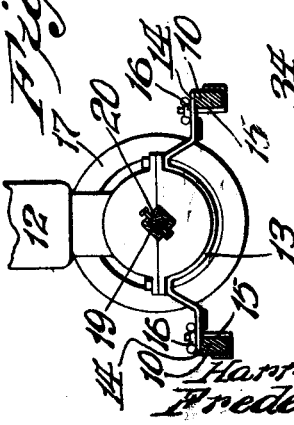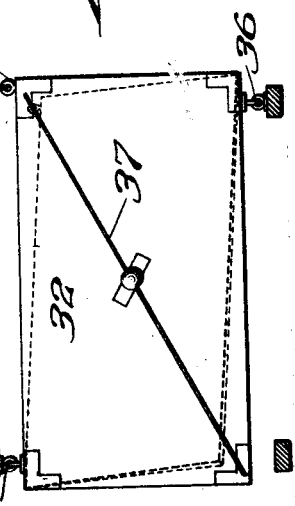

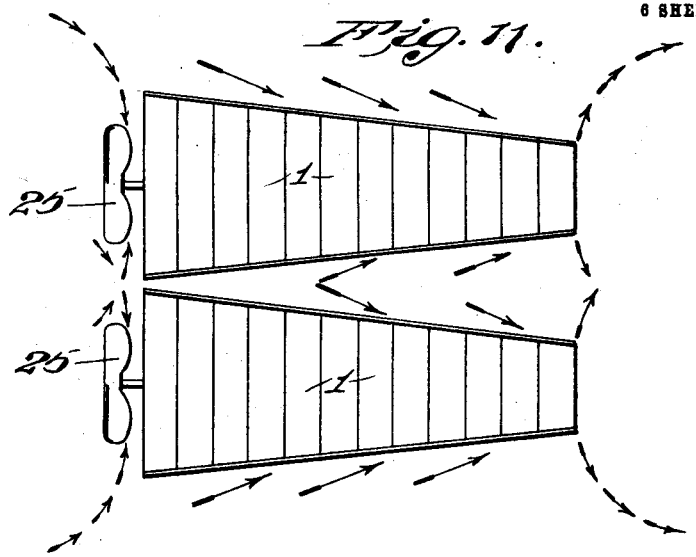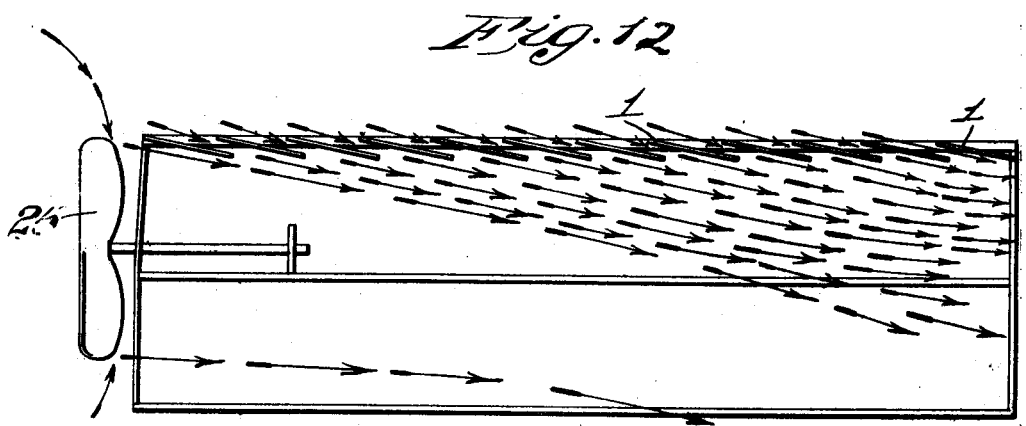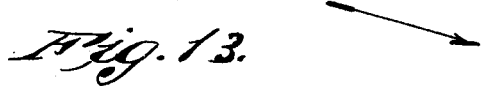

UNITED STATES PATENT OFFICE.

HARRY W. MACOMBER AND FREDERICH H. D. BERGMANN, OF ST. LOUIS, MISSOURI.

AEROPLANE.

1,076,218.

Specification of Letters Patent.  Patented Oct. 21, 1913.

Application filed April 1, 1911. Serial No. 618,323.

*To all whom it may concern:*

Be it known that we, HARRY W. MACOMBER and FREDERICH H. D. BERGMANN, citizens of the United States, and residents of the city of St. Louis and State of Missouri, have invented certain new and useful Improvements in Aeroplanes, of which the following is a specification.

This invention relates to aeroplanes and has for its primary object to provide an improved construction, combination and arrangement of parts in devices of this character.

One of the objects of the present invention is to provide an improved distribution of the sustaining surface or surfaces, and an improved coöperative relation between the different portions of the sustaining surface or surfaces.

One of the objects of the present invention is to provide improved means for modifying the lateral movement of an aeroplane whereby it may be turned from side to side or by means of which it may be caused to drift laterally during its forward movement, thereby obviating the necessity of going through a succession of turns to prevent running into anything in its path.

A further object is to provide improved means for lifting the aeroplane or causing it to descend, said means being adapted to maintain a supporting column of air from below in whatever position the aeroplane assumes while ascending or descending in a straight course or while turning from side to side during its ascent or descent.

Another object is to provide improved means for shifting the power plant or engine whereby the center of gravity may be moved rearwardly to facilitate the rise of the machine into the air and again removed to a central position under the sustaining plane after the machine is in full flight.

Another object is to provide improved means for mounting the land wheels, and an improved skidding support for that portion of the chassis frame upon which the motor and other heavy portions of the running gear are mounted.

Other and further objects will appear in the specification and be specifically pointed out in the appended claims, reference being had to the accompanying drawings exemplifying the invention and in which, Figure 1 is a top plan view of an aeroplane constructed in accordance with the principles of this invention. Fig. 2 is a front elevation of the same. Fig. 3 is a rear end elevation of the same. Fig. 4 is a side elevation of the same. Fig. 5 is a section on the line V—V, Fig. 1. Fig. 6 is a section on the line VI—VI, Fig. 4. Fig. 7 is a section on the line VII—VII, Fig. 4. Fig. 8 is a section on the line VIII—VIII, Fig. 7. Fig. 9 is an enlarged detail section on the line IX—IX, Fig. 5. Fig. 10 is a fragmentary top plan view of one of the elevators. Fig. 11 is a diagrammatic top plane view of the aeroplane in motion showing the actions of the air currents. Fig. 12 is a similar diagrammatic view in side elevation. Fig. 13 is a diagrammatic end view showing the actions of the air currents during a vertical descent.

Referring more particularly to the drawings and to the embodiment shown therein, the top plane proper is constructed in two portions, each of which comprises a plurality of sections 1, which sections are bowed transversely of the machine and inclined respectively downwardly and rearwardly. Each of said sections, as shown best in Figs. 5 and 9, is preferably arranged with their forward edges at substantially the same elevation, their rear edges being depressed and spaced from the forward edges of the respective sections immediately behind them. Said sections are, furthermore, as shown most clearly in Fig. 1, narrowed rearwardly so that the oppositely disposed portions of the top plane are made gradually narrower toward the rear, leaving a wedge-shaped space between said portions which widens rearwardly. An inspection of Fig. 4 will show further that the lateral edges of the top plane sections are depressed more and more toward the rear to provide gradually deepening inverted channels in the top plane portions, these channels becoming narrower toward the rear. As details of construction, each portion of the top plane is provided with a ridge pole or beam 2 and a pair of side bars 3, which converge rearwardly and are inclined downwardly, said ridge beam 2 and side bars 3 being rigidly connected by a plurality of bowed cross members or bars 4 which are set in the upper edge of the ridge beam 2 and are rigidly connected at their outer ends with the side bars 3 in any suitable manner. Immediately below the cross bars 4 are other cross bars 5 which are secured to the lower edge of the ridge beam and to said side bars 3. The sections of the top plane portions are provided in the present embodiment by securing a number of sheets of any suitable flexible material at their forward edges to bowed cross members 4 and at their rear edges to cross members 5, thus providing intake openings between adjacent plane sections for admitting air below each section during the forward movement of the aeroplane. As shown in Fig. 4, each portion of a top plane is trussed by having a plurality of brackets 6 disposed along the upper edge of the beam 2 for carrying a tension member 7 which is secured fore and aft to the beam 2. Another tension member 8 is similarly mounted on the under edge of the beam 2.

Rigidly suspended from the top frame just described, by means of a plurality of vertical members 9 is a chassis frame comprising side bars 10 and cross bars 11. As shown best in Figs. 7 and 8, an engine 12 is slidably mounted upon side bars 10 by having its cylinder carried at either end by a band iron saddle 13, said saddles being rigidly secured to the cylinder of said engine. The laterally extending ends 14 of said saddles rest directly upon the side bars 10 and are slidably secured thereto by means of stirrups 15 which pass under the side bars 10 and may be drawn into clamping engagement therewith by means of the thumb nuts 16 on the upper threaded ends of said stirrups. The engine is provided with a fly wheel 17 on the rear end of the engine shaft 18, said engine shaft being provided with a squared block 19 secured in the end of a rectangular sleeve 20. Slidably mounted within said sleeve 20 is another block 21 rigid with the end of a transmission shaft 22, said transmission shaft being provided with a pair of driven sprockets 23 over which pass, respectively, sprocket chains 24. At the forward end of the aeroplane and below the level of the top planes, a pair of propellers 25 are mounted upon the forward ends of horizontal shafts 26 (see Fig. 6). The axes of the shafts 25 are disposed approximately in the central vertical plane of the top plane portions, said propellers being adapted, as will hereinafter be pointed out, to project a converging column of air under said planes. Each of the shafts 26 has keyed thereto a sprocket 27 to which the chains 24, respectively, deliver power.

Referring now to Figs. 4 and 6, a center board or keel is provided in the central vertical longitudinal plane of the machine, said center board being therefore centered with respect to the rearwardly enlarged opening between the top plane portions. Said center board comprises an open frame work suspended some distance below the top plane, and a plurality of pivotally mounted vanes 28 closing the rear end of said frame and several pivotally mounted vanes 29 closing the forward end, said center board being substantially composed of these movable sections or vanes 28 and 29. When therefore these vanes 28 and 29 are all turned in the same direction, not only is the aeroplane caused to shift bodily to one side without turning, but the center board offers only such resistance to lateral currents of air as serves to impart a forward impetus to the machine. In emergencies or whenever for any reason, it is desirable to swing the machine about within a short radius, the vanes 28 may be turned oppositely to the vanes 29 so that the only resistance offered by the centerboard is that which swerves it sharply. It will be noted that each of said vanes is pivoted forward of its longitudinal center so that there will be a normal tendency to hold them in the position shown in Fig. 6. On either side of the aeroplane at its front end, and disposed below the top planes, are elevator planes 32, said planes being arranged in pairs one above the other on each side. A feature of peculiar importance in connection with these elevator planes 32, is that they are mounted to swing about an axis oblique to the direction of flight, that is, about an axis inclined to the central vertical longitudinal plane of the machine. In the present embodiment this purpose is carried out by providing a pivotal connection between the inner lateral edge of each vane at 33 and an upright rod 34 extending between a horizontal transverse frame member 35 disposed below and in advance of the top plane portions. Approximately diagonally opposite the pivotal connection 33 is a second pivotal connection 36, the swinging axis being a straight line connecting these two pivotal connections. Each pair of elevator planes 32 are preferably connected together to move in unison and each is strengthened by a suitable truss 37. Any suitable cable or cord 38 may be passed over pulleys 39 and thence to any suitable part of the machine to be within reach of the aviator. Adjacent the rear end of the aeroplane and below each plane portion, is an elevator vane 40, each of said vanes being pivotally connected at diagonally opposite corners to portions of the machine frame. These elevator vanes are adapted to be operated similarly to the elevators 32 to raise and lower the back end of the machine.

In order to adapt the aeroplane to come to earth after a flight without causing undesirable shock and injury to the more heavily loaded parts of the chassis frame, elongated front bars 11 are secured to the chassis frame with ends overhanging on either side. The bars 11 may be made of spruce or any other suitable material which will make them flexible and elastic, the forward land wheels 42 being journaled in resilient members carried by the bars 11. The outer ends of the resilient bars 11 are reinforced by resilient supports 43 which are secured at 44 to the bars 11 and have their outer ends slidably engaging said bars 11. Struts 45 extend between the members 43 and oblique bars 46, which are also preferably of resilient materials. Further resilient support is gained by providing the helical springs 47 secured to portions rigid with the skid runners presently to be described. Rods 48 connect the springs 47 with the outer ends of bars 11 while material support is obtained for the chassis and kindred parts from above by connecting the outer ends of bars 11 with the horizontal bars 35 by means of cables 48ᵃ. The skid just referred to comprises a pair of runner bars 49 which, as shown in Figs. 2 and 4, converge in front and are bowed upwardly to right the machine when striking at an angle. In the rear, said runners are bent upwardly to meet the chassis frame behind the engine. In this way, when the machine drops, the resiliently mounted wheels give until the skid strikes the ground to provide a strong support for taking up the momentum of the heavier parts on the forward end of the chassis.

Referring now to Figs. 11 and 12, the action of the propellers in connection with the sections of the top plane portions, will be understood. By moving the engine rearwardly, the leverage exerted by the lifting planes is increased. As the machine is impelled forwardly, the sections of the top plane portions are brought more and more into action and as the engine is moved forwardly to return the center of gravity under the center of pressure of the top planes, the air rushing through the openings between adjacent sections increases the lifting effect and as shown in Fig. 12, creates a gradually deepening bank of air which is supported by the wind from the propellers. The result is that there is a very material compression of the air which greatly increases the lifting effect of the aeroplane sections. To augment the compression effect, the propellers being disposed at the opening ends of the inverted channels under the aeroplane sections, by discharging their pyramidal columns of air, afford a substantial reinforcement to the air entering through the spaces between the sections. Furthermore, by reason of the peculiar combined hollows of the blade on the propellers, the air is drawn from all sides as well as from in front, as indicated by arrows in Figs. 11 and 12. As indicated in Fig. 13, in the event of the straight descent of the aeroplane, the open space between the portions of the top plane, admits of a central column of air passing upwardly in connection with the lateral columns on the outside of the aeroplane, thus obviating the disadvantages which would result were the plane an integral one. Moreover, the sectional construction of the aeroplane portions, permits of a ready escape of the entrapped air upwardly but at the same time provides sufficient resistance to insure a slow descent in case of emergency. Another very important function of the sectional construction of the top plane is that in descending, should the machine become inclined to such an angle as would cause most other machines to plunge downwardly, the openings between the plane sections admit air under the top planes and thereby builds up a support which would otherwise be cut off by a continuous plane.

In operating the plane on a level beam, should it be desired to change its direction within a small compass, the forward vanes 28 (see Fig. 6) may be inclined in one direction to the central vertical longitudinal plane of the machine while the rear vanes 29 may be inclined in the other direction to coöperate therewith in imparting a sharp angular movement to the aeroplane. A lateral drift is imparted by setting all of these vanes in one direction. The elevator planes 32 are in this connection of peculiar importance, since by reason of their angular movement about an axis inclined to the central vertical longitudinal plane of the machine, their variation from the normal horizontal plane can be brought about more gradually and with less effort due to the fact that the portion thereof which is farthest from the swinging axis is only a corner while the broader portion of the plane which would be caught by the wind is adjacent to the swinging axis so that the movement of the plane can be better controlled. Furthermore, in the event of these elevator planes being used simultaneously with a change in the direction horizontally, their surfaces being disposed in planes inclined to the above movement, effectually provides against the air column slipping from under the aeroplane portions by reason of the bank of air which is thus maintained. Extending from the connected extremities of the upwardly deflected runners 49, is a tie rod 60 which is connected to a part rigid with the top plane by means of a cushioning device 61 which is preferably a pneumatic cushion.

What we claim is:

1. In a machine of the character described, an aeroplane comprising a plurality of overlapping sections with air inlet openings between said sections, said sections being arranged in a series in the line of flight of the machine and with their forward edges in the same horizontal plane, each of said sections having its lateral edges drooped more than the next one in front.

2. In a machine of the character described, a top plane constructed in two laterally divided portions, each portion comprising a plurality of sections inclined rearwardly and downwardly with the forward edge of all but one of the sections disposed above and spaced from the rear edge of adjacent sections.

3. In a machine of the character described, an aeroplane constructed in two portions each with converging lateral edges, each portion comprising a plurality of sections inclined rearwardly and downwardly with the forward edges of the respective sections disposed above and spaced from the rear edges of the sections in front, respectively, the under surface of said sections being concaved transversely of the machine and increasing in depth from the front to the rear.

4. In a machine of the character described, the combination with a ridge beam, of two side bars spaced from and inclined toward said ridge beam rearwardly, a plurality of cross bars secured to said side bars and the top edge of said ridge beam, other cross bars secured to the side bars and the bottom edge of said ridge beam beneath the other cross bars, respectively, and a plurality of sheets of flexible material secured along their forward edges to the first said cross bars, respectively, and along their rear edges to said other cross bars.

5. In a machine of the character described, a top plane constructed in laterally separated portions elongated in the direction of flight, said portions being provided with air inlet openings exposed in the direction of flight and arranged in series from front to rear of said aeroplane.

6. In a machine of the character described, the combination with a top plane constructed in two portions with an air space between them, of a pair of rectangular elevator planes on the outer edge of each portion, said elevator planes being pivotally mounted at diagonally opposite corners.

7. In a machine of the character described, the combination of a top plane constructed in two separate portions concave as seen from below, each of said portions being narrowed from front to rear and of increasing depth toward the rear, and propellers disposed, respectively, below and in front of each of said portions.

8. In a machine of the character described, the combination of a top plane constructed in two separate portions concave as seen from below, each of said portions being narrowed from front to rear and of increasing depth, and propellers disposed, respectively, below and in front of each of said portions, each of said portions being constructed of a plurality of rearwardly and downwardly inclined sections having their forward edges disposed above and spaced from the rear edges of the sections immediately in front.

9. In a machine of the character described, the combination with a top plane constructed in two divided portions each narrowed rearwardly, each of said portions being concave as seen from below and of gradually increasing depth, a propeller at the forward end of each portion, an elevator plane disposed at the forward edge and on the outside of each portion, and an elevator plane disposed below the rear end of each portion.

10. In a machine of the character described, the combination with a top plane constructed in two divided portions each narrowed rearwardly, each of said portions being concave as seen from below and of gradually increasing depth, a propeller at the forward end of each portion, an elevator plane disposed at the forward edge and on the outside of each portion, and an elevator plane disposed below the rear end of each portion, each of the elevator planes along the forward edge of the machine being movable about an axis inclined to the central vertical longitudinal plane of the machine.

11. In a machine of the character described, the combination with a top plane constructed in two portions narrowed rearwardly to form a wedge-shaped space between said portions, of a plurality of guiding vanes movable about axes in a vertical plane dividing said wedge-shaped space, and a plurality of elevator planes disposed along the outside edges of said portions on the top plane, said elevator planes being movable about axes inclined to the central longitudinal plane of the machine.

12. In a machine of the character described, the combination with a top plane elongated in the direction of flight, of a plurality of guiding vanes disposed on vertical axes below the rear end of said top plane, and other guiding vanes disposed on vertical axes under the forward end of said top plane, the guiding vanes at the forward end being movable independently and in an opposite direction to the vanes under the rear of said plane, and propeller blades disposed on opposite sides of said guiding vanes.

13. In an aeroplane, a pair of laterally spaced rearwardly contracted top plane portions, each concave as seen from below and increasing in depth toward the rear.

14. In an aeroplane, a pair of laterally spaced rearwardly contracted top plane portions, each concave as seen from below and increasing in depth toward the rear, and a propeller in front of each top plane portion.

15. In an aeroplane, a pair of laterally spaced rearwardly contracted top plane portions, each concave as seen from below, and a propeller in front of each of said top plane ortions, said propellers being constructed to draw in the air radially and to compress it under said sections.

HARRY W. MACOMBER.
FREDERICH H. D. BERGMANN.

In the presence of—
  J. B. MEGOWN,
  M. C. HARMON.